June 10, 1941.     C. F. PURDY     2,244,896
FENDER SHIELD AND SUPPORT
Filed Aug. 5, 1939     2 Sheets-Sheet 1
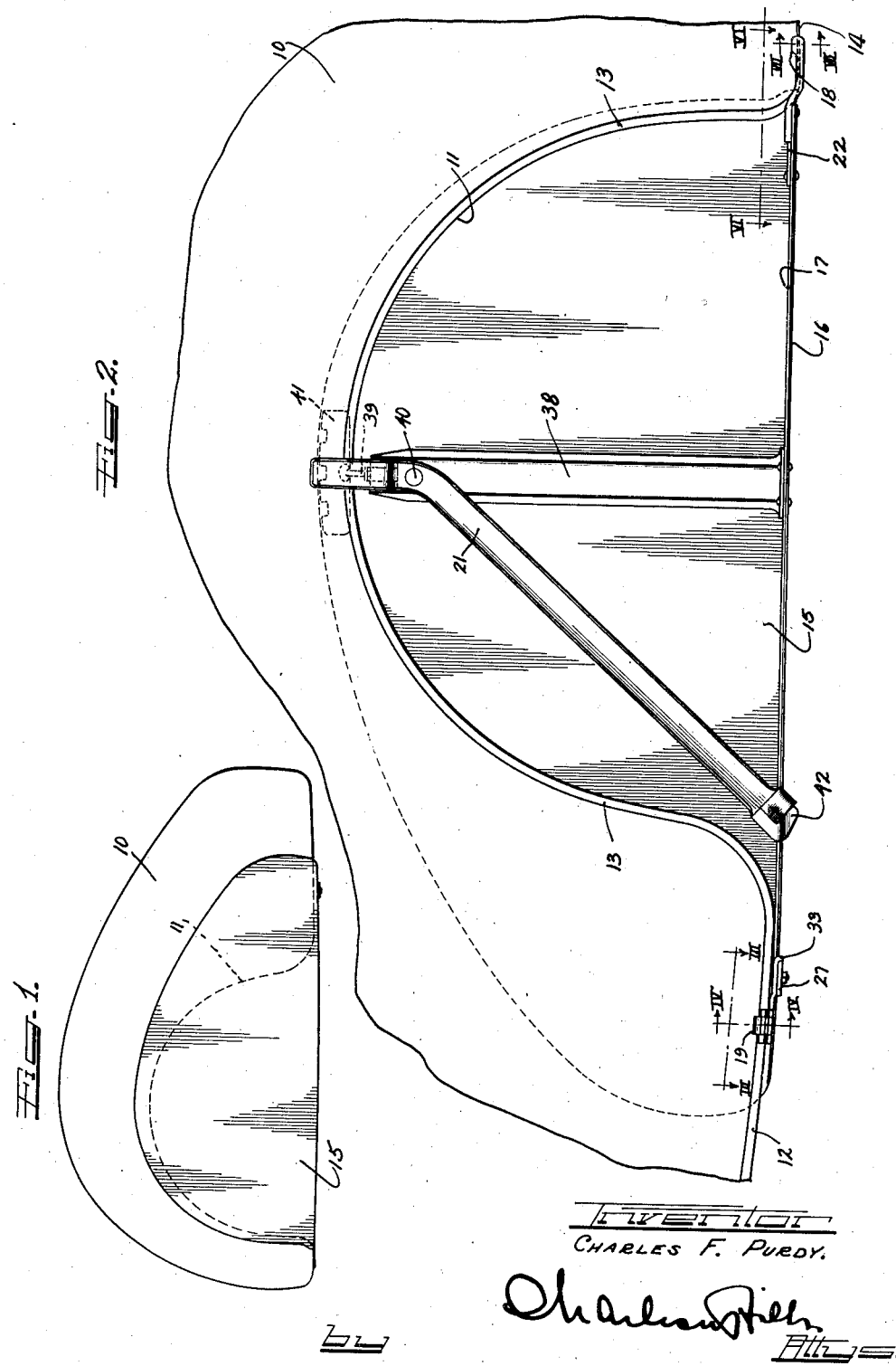
Inventor
CHARLES F. PURDY.

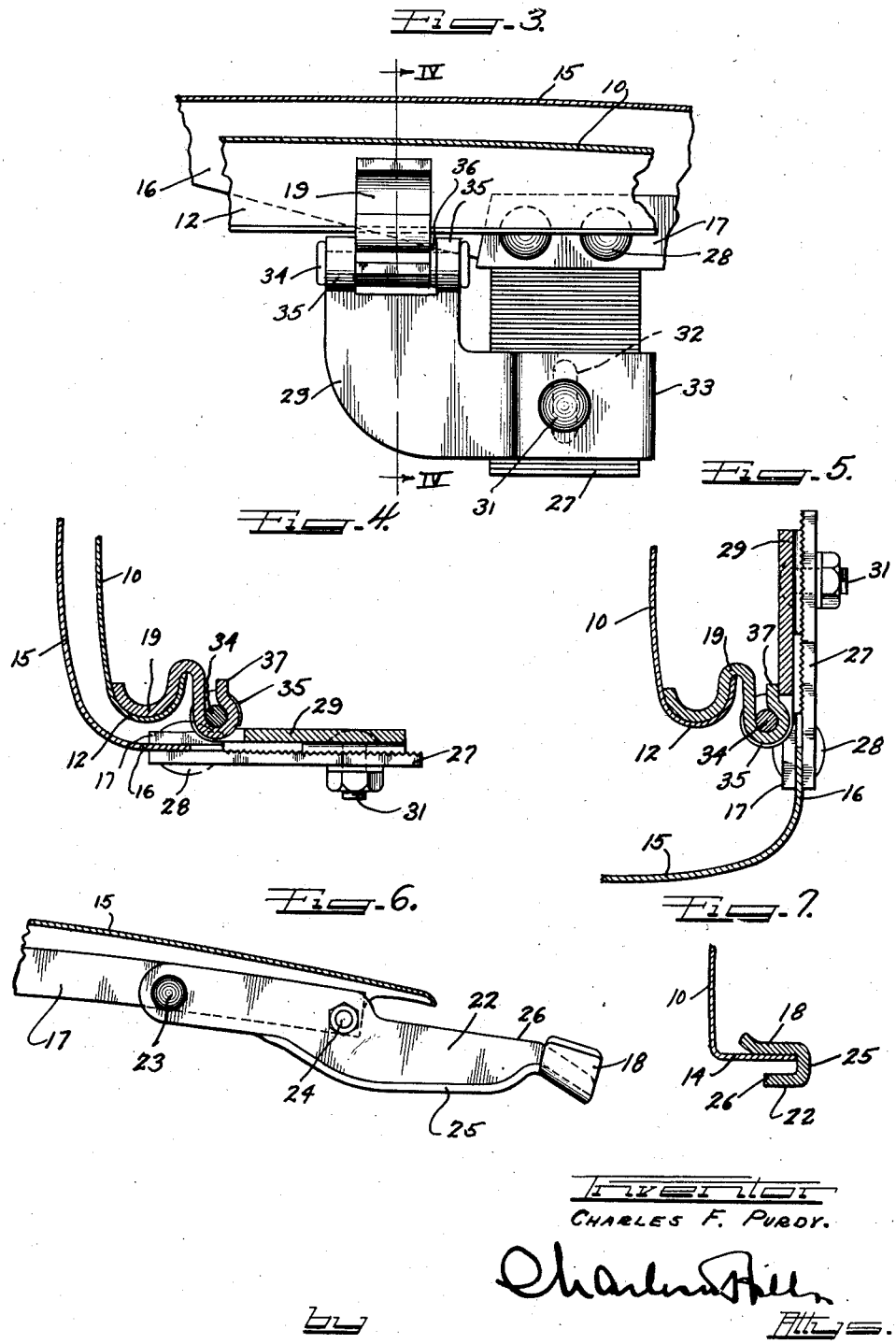

Patented June 10, 1941

2,244,896

UNITED STATES PATENT OFFICE 2,244,896

FENDER SHIELD AND SUPPORT

Charles F. Purdy, Detroit, Mich., assignor to Houdaille-Hershey Corporation, Detroit, Mich., a corporation of Michigan Application August 5, 1939, Serial No. 288,513

5 Claims. (Cl. 280—153)

This invention relates to means for covering or closing the wheel access opening in the fender of a vehicle or in other types of wheel enclosures. In particular my invention relates to "fender shields" or "fender skirts," as such devices are known when used in connection with a fender, but this invention is equally applicable to automotive vehicles having a body wide enough to enclose the wheel without the use of fenders, and in which the wheel access openings are in the sides of the body itself. Bodies having such a width are to be found today only among commercial vehicles, but I wish it to be expressly understood that this invention is equally applicable to such bodies on commercial vehicles and also on private vehicles, if at some time in the future such bodies should come into use on private vehicles. Therefore, while I have referred to my invention as a fender shield, it is to be clearly understood that this term includes covers for wheel access openings in the side of a body or other wheel enclosing member as well as for wheel access openings in fenders.

In designing ornamental fender shields or skirts of the type which is adapted to cover the usual wheel access opening in a vehicle fender or body, it is important that the means which is employed to secure the fender shield in desired position be simple and quick to operate both in assembling the fender shield on the vehicle fender and in removing it therefrom. It must also possess a considerable degree of ruggedness when in use and be substantially free from vibration and noise.

It is also desirable to provide a fender shield having a panel of which no portion fits within the wheel access opening and against the edge of the fender, thus making the fit of the fender shield independent of the exact size of the wheel access opening and making possible the use of the same fender shield panel on different fenders of the same general contour merely by changing the adjustment of the fender shield panel supporting means.

Fender shields having the above mentioned desirable characteristics have been designed and are now in production, being made according to the design disclosed in the co-pending application of George W. Schatzman, Serial No. 271,915 entitled "Fender shield and mounting means therefor" and having the same assignee as the present application.

One of the principal objects of the present invention is to provide a fender shield of the general character described above and adapted to fit upon a fender whose lower edge not only turns in but also turns up so as to form a trough-like section along the edge of the fender instead of merely a flange.

Another object of the present invention is to provide a supporting means for fender shields which is adaptable, not only to fender shields of the type referred to above, but also to other types of fender shields and which permit the fender shield to be swung into place after one portion is connected to the fender.

More specifically, it is an object of the present invention to provide a means for attaching fender shields of the design referred to above to fenders whose lower edge is turned in and up at one side of the wheel access opening to form an upwardly facing reinforcing channel along the edge of the fender.

In accordance with the general features of this invention, there is provided a member which is adapted to hook on to the upturned edge of the fender at one side of the wheel access opening and which is pivotally connected to the bottom of the fender shield so as to allow the fender shield to be first hooked on to the fender at the bottom and then swung up into place.

Another feature of this invention is the provision of a swingable hook which is removably fastened to the bottom of a fender shield so that it may be replaced by other types of support for permitting the fender shield to be used with other types of fenders.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevation of one of the preferred forms of my invention as it appears when mounted on a fender;

Figure 2 is a side elevation of the form of the invention shown in Figure 1 as seen from the inside of the fender;

Figure 3 is a horizontal section taken on the line III—III of Figure 2, and showing one of the fender shield supporting means as seen from above;

Figure 4 is a cross-section on the lines IV—IV of Figures 2 and 3 looking in the direction of the arrows;

Figure 5 is a cross-section similar to Figure 4 but showing the parts in the position which they assume before the fender shield is swung up into place;

Figure 6 is a section on the line VI—VI of Figure 2, with the fender omitted, showing the fender shield support at the front of the fender shield; and Figure 7 is a cross-section on the line VII—VII of Figure 2 looking in the direction of the arrows.

The embodiment of the invention shown in the drawings is designed to be mounted upon a conventional "streamlined" automobile fender 10 having an approximately semi-circular wheel access opening 11. The edge of the fender along the bottom in back of and around the wheel access opening 11 is bent in and up so as to form an upwardly facing trough-like reinforcing portion 12, 13. The trough 12, 13 flattens out or merges into a horizontal flange 14 ahead of the wheel access opening, as shown in Figures 2 and 7.

The fender shield comprises a sheet metal panel 15 which is large enough to cover the entire wheel access opening 11 as shown in Figures 1 and 2. The lower edge of the panel 15 is approximately straight and is bent back to form a horizontal flange 16, to the upper side of which is secured a reinforcing bar 17. The remainder of the edge of the panel 15, at the end and around the top, is folded back to form a thin U-shaped reinforcement and is provided with a rubber edging to prevent metal to metal contact between the fender shield panel 15 and the side of the fender 10. This detail forms no part of the present invention, although it is employed on the preferred embodiment, and is fully illustrated and described in the copending application referred to above.

The bottom of the fender shield is provided with two hooks 18 and 19 by means of which the fender shield is connected to the inturned flange 14 and the upturned edge of the fender 12 in front of and in back of the wheel access opening. The two hooks 18 and 19 form pivots defining a horizontal axis about which the fender shield panel 15 may be rocked up into a position against the side of the fender. In mounting the fender shield, the panel 15 is held approximately horizontally with its lower edge under the edge of the fender, and the hooks 18 and 19 are hooked up on to the fender flange 14 and the upturned fender edge 12. The panel is then swung up into a vertical position against the side of the fender, and its top is secured by a latch 21 more fully described below.

The front hook 18 is formed integrally with a pressed steel arm 22 which is secured to the front end of the reinforcing bar 17 by means of a pair of suitable fastening elements 23 and 24. The arm 22 may be shaped so as to lie entirely behind the upturned edge 13 and flange 14 of the fender, but a more economical construction is provided if the arm 22 extends under the flange 14 and is provided with a flange 25 extending along its rear edge and projecting up behind the fender flange 14. Although the arm 22, if constructed in this manner, may be seen from the outside of the fender when the fender shield is in place and the eye is level with the lower edge of the fender shield, it is entirely unnoticeable to a person standing near the car if the arm is shaped so that its outer edge 26 is set back a little from the face of the fender edge, as shown in Figure 7.

The hook 19 at the rear of the fender shield is carried by a bracket 27 which projects back in from the flange 16 along the bottom of the fender shield panel 15 and which is fixed to the flange 16 and the reinforcing bar 17 by means of rivets 28. The hook 19 is not secured directly to the bracket 27 but is pivoted to a base 29 fixed to the top of the bracket 27 by means of a bolt 31.

A method of adjusting the hook 19 relative to the fender shield panel 15 in order to adapt the fender shield to different fenders which may differ slightly is provided by making the hole 32 for the rear bracket bolt 31 elongated so that the base 29 of the rear hook may be secured to the bracket 27 in different positions. The top of the bracket 27 and the bottom of the base 29 are formed with interfitting ridges and grooves and the base 29 is formed with a flange 33 fitting around one side of the bracket 27 in order to prevent any accidental twisting of the base 29 on the bracket 27.

The pivotal connection between the rear hook 19 and its base 29 is similar to a hinge and is formed by a pin 34 extending through eyes 35 formed on the base 29 and through a portion of the hook 19 formed to fit around it. Suitable means are provided to prevent free swinging of the hook 19 with respect to its base 29. This means may consist in simply making the hinge pin 34 a moderately tight fit or a spring washer 36 may be placed on the hinge pin 34 between the hook 19 and one of the ears or eyes 35. One end of the hook 19 is formed into a stop 37 placed so as to come up against the surface of the base 29 when the hook 19 is swung to the position shown in Figure 5 in order to facilitate the manipulation of the hook and the rest of the fender shield when the fender shield is being placed in position on the fender.

In mounting the fender shield upon the fender, the hook 19 is first swung to the position shown in Figure 5, in which position it will be retained by the friction on the hinge pin or the friction provided by the spring washer 36. The fender shield is then held horizontally with its lower edge below and slightly behind the lower edge of the fender. The fender shield is then lifted up and brought forward until the rear hook 19 engages with the upturned edge 12 of the fender in back of the wheel access opening, as shown in Figure 5, and the end of the front hook 18 rests upon the flange 14 of the fender ahead of the wheel access opening. The fender shield is then swung up into a vertical position, pivoting at the rear on the hinge pin 34 and, at the front, on the end of the hook 18. When this swinging movement is completed, the parts have assumed the positions shown in Figures 4 and 7. The panel 15 is then secured in its upright position against the side of the fender by means of the latch 21.

The fender shield panel 15 may be shaped so that it will fit against the side of the fender 10 without being strained, but it has been found that a much tighter and better fit can be secured if the fender shield panel 15 is formed so that, before it is mounted on the fender, the edges at the front and rear are less convex than the side of the fender and the edge at the central portion of the top is more convex than the side of the fender. With the fender shield panel 15 shaped in this manner, it is found that, when the hooks 18 and 19 are hooked on to the flange 14 and the upturned edge 12 at the bottom of fender and the panel 15 is swung up into position against the side of the fender, a tight contact between the edge of the fender shield panel and the fender is first made at the ends of the fender shield near the bottom while the top of the panel is still spaced out from the side of the fender. As the top of the fender shield is pressed into position, the fender shield panel 15 is sprung or strained slightly and the distance along which the edge of the fender shield panel is in tight contact with the side of the fender extends from at each end of the fender until the entire edge of the fender shield panel is in tight contact. The latch 21 may then be swung up behind the upturned edge 13 of the fender and the top of the wheel access opening to hold the fender shield in its position.

The latch 21 is a dog-legged lever which is pivoted by a rivet 40 to the back of a sheet metal stay 38 on the back of the fender shield. The stay 38 is channel-shaped in cross-section and its lower end is flat and bent out horizontally to form a foot which is riveted to the top of the reinforcing bar 17. The upper end of the stay 38 is connected by a vertical pivot 39 to a flat plate 41 secured to the upper edge of the panel 15. This construction, which is described in detail in the copending application referred to above, permits the upper end of the stay 38 to twist slightly relative to the lower end. The handle end 42 of the latch lever 21 is shaped to fit around the flange 16 and reinforcing bar 17 along the lower edge of the fender shield panel 15, and the torsional resiliency of the upright stay 38 allows it to be swung back out of engagement when it is desired to swing the handle down from the latched position shown in Figure 2.

While I have shown only one particular embodiment of my invention and have shown it only as applied to the design of fender shield disclosed in the above mentioned copending application, it will of course be understood that the invention is not limited thereto, since many modifications may be made, and I therefore contemplate by the appended claims to cover all such modifications as fall within the true spirit and scope of my invention.

I claim as my invention:

1. In a fender shield comprising a panel adapted to cover the wheel access opening in a fender having an upturned lower edge extending along the bottom of the fender on at least one side of said opening, means for supporting said panel on said fender including a hook adapted to fit on said upturned fender edge and pivotally connected to the bottom of said panel for swinging with respect thereto about a substantially horizontal axis parallel to the plane of said panel.

2. In a fender shield comprising a panel adapted to cover the wheel access opening in a fender having an upturned lower edge extending along the bottom of the fender on at least one side of said opening, means for supporting said panel on said fender including a hook adapted to fit on said upturned fender edge and pivotally connected to the bottom of said panel for swinging with respect thereto about a substantially horizontal axis parallel to the plane of said panel, and means for preventing the swinging of said hook past a position in which said hook can fit on said upturned fender edge when said panel is swung down from the attached position thereof to a horizontal position.

3. In a fender shield comprising a panel adapted to cover the wheel access opening in a fender having an upturned lower edge extending along the bottom of the fender on at least one side of said opening, means for supporting said panel on said fender including a hook adapted to fit on said upturned fender edge and pivotally connected to the bottom of said panel for swinging with respect thereto about a substantially horizontal axis parallel to the plane of said panel, said hook being provided with means for preventing free swinging thereof.

4. In a fender shield, comprising a panel adapted to cover the wheel access opening in a fender having an upturned lower edge extending along the bottom of the fender on at least one side of said opening, means for supporting said panel on said fender including a bracket projecting back from and secured to the bottom of said panel, said bracket being adapted to project under and beyond said upturned fender edge, and a hook adapted to fit on said upturned fender edge and pivoted to said bracket.

5. In a fender shield comprising a panel adapted to cover the wheel access opening in a fender having an upturned lower edge extending along the bottom of the fender on at least one side of said opening, means for supporting said panel on said fender including a bracket projecting back and secured to the bottom of said panel, said bracket being adapted to project under and beyond said upturned fender edge, a base member adjustably secured to said bracket, and a hook adapted to fit on said upturned fender edge and pivoted to said base member.

CHARLES F. PURDY.